Dec. 22, 1953   J. RENDE   2,663,041
FLEXIBLE CLEANER FOR CAR WASHING MACHINES
Filed March 12, 1948   2 Sheets-Sheet 2
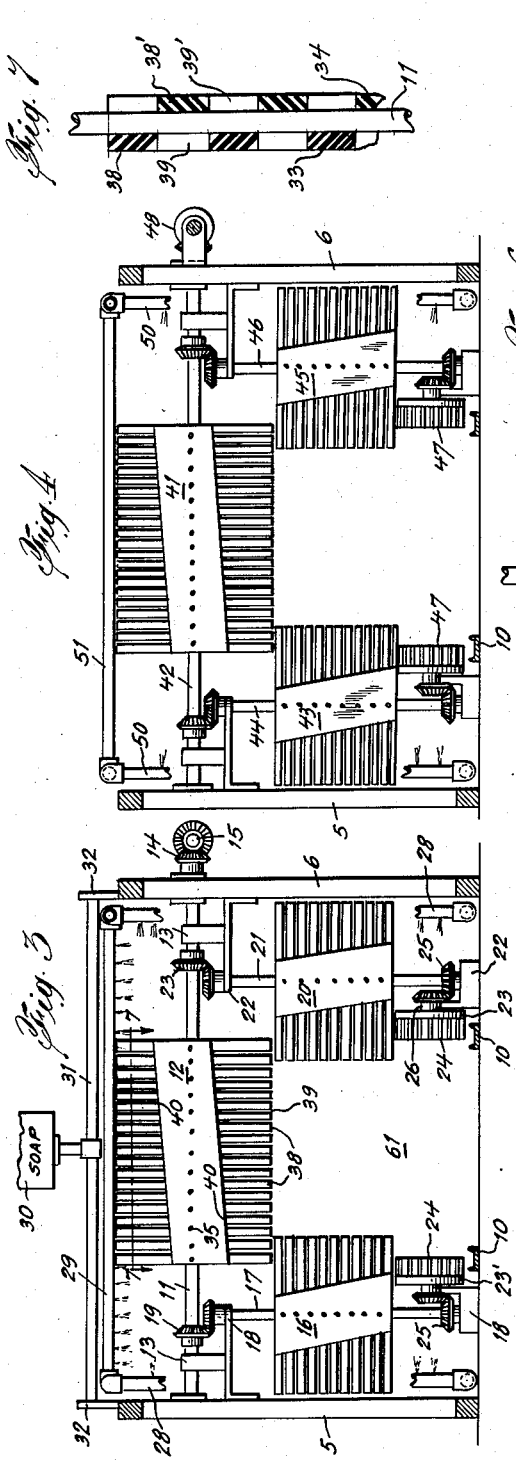
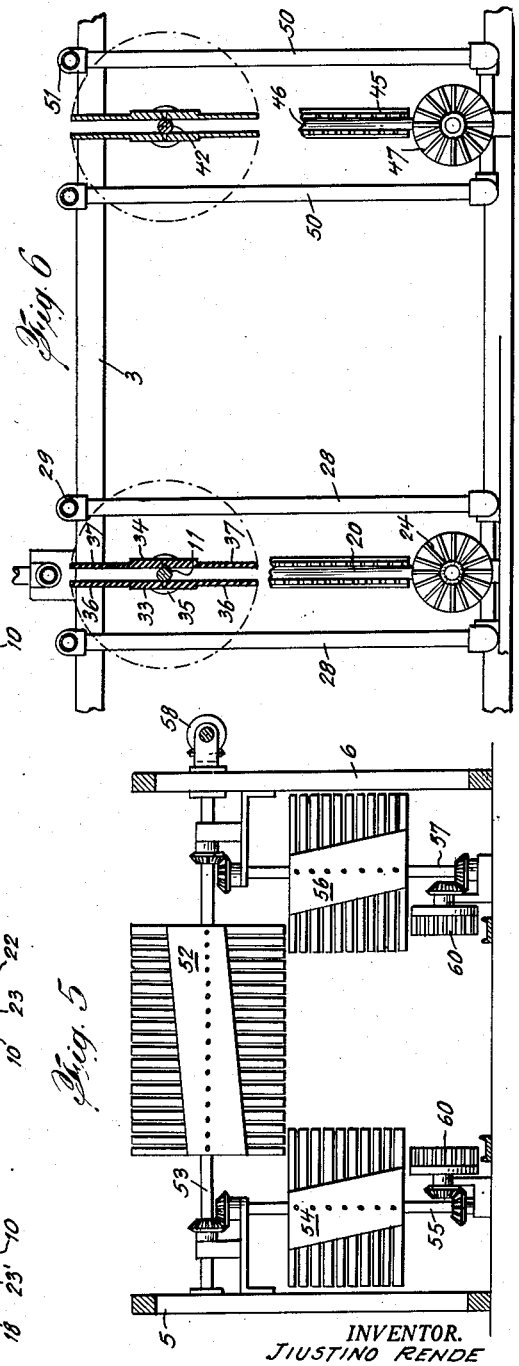
INVENTOR.
JIUSTINO RENDE
BY
ATTORNEY Patented Dec. 22, 1953

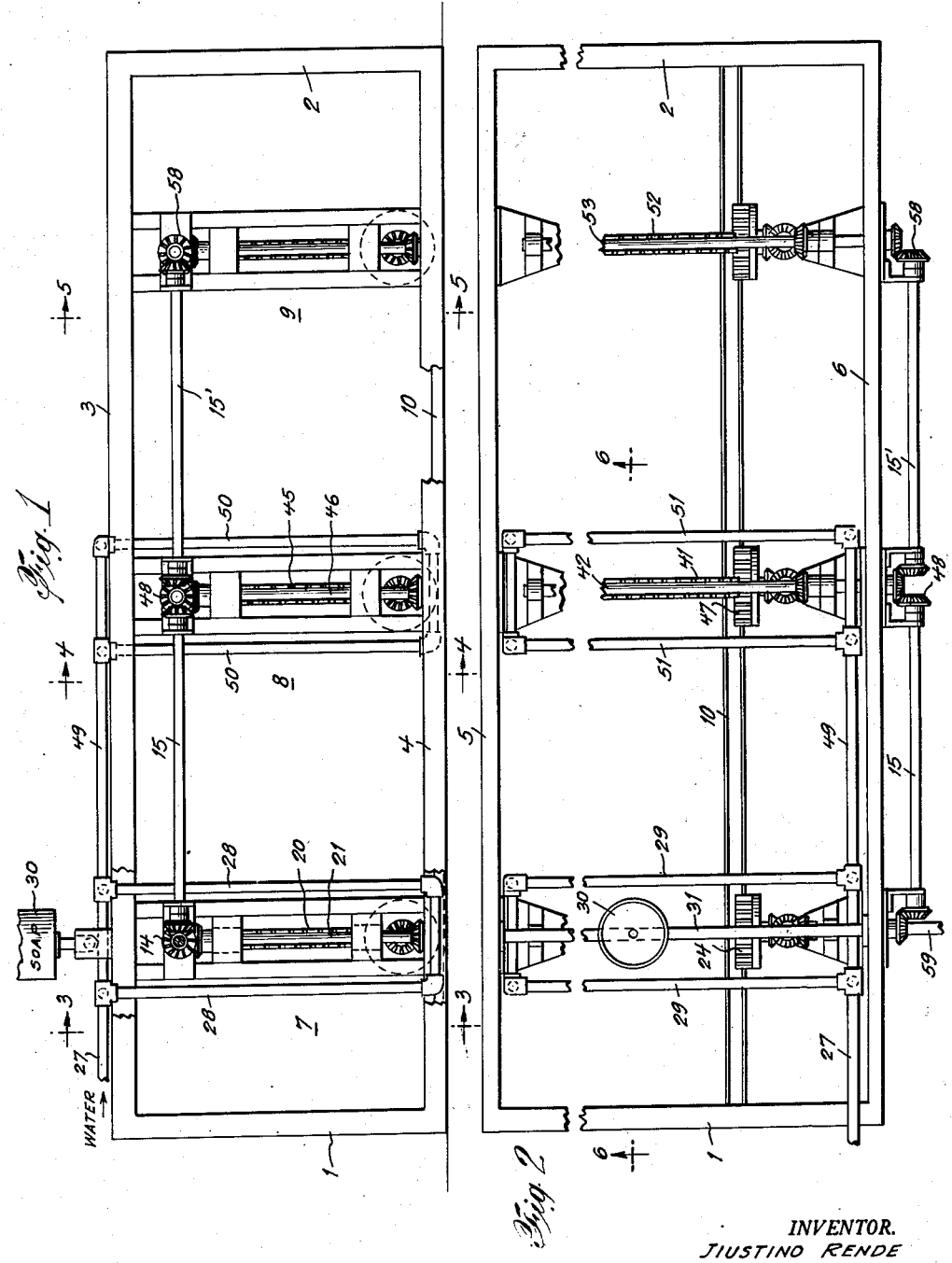

2,663,041

UNITED STATES PATENT OFFICE 2,663,041

FLEXIBLE CLEANER FOR CAR WASHING MACHINES

Jiustino Rende, New Rochelle, N. Y.

Application March 12, 1948, Serial No. 14,581

7 Claims. (Cl. 15—230)

The present invention is directed to washing machines, more particularly to an apparatus adapted for washing vehicles, such as passenger cars, or the like.

It has been previously proposed to provide devices for washing cars wherein sprays of liquid were provided so that the entire vehicle might be washed in a very short time. In some instances, revolving brushes were provided to assist in the operation. However, such devices were not entirely satisfactory in that they did not fully and completely remove the dirt from the vehicle and it was necessary to provide a hand operation in order to complete the cleaning. Because of the brushes used in such installations, scratching was likely to occur because of the stiffness of the bristles, thus damaging the finish of the vehicle. Because of the use of brushes, there was not complete contact thereof with the body of the vehicle and this resulted in a streaky cleaning thereof. Furthermore, it was necessary where prior devices had been used, to provide a separate hand operation for drying the vehicle after the cleaning was complete.

The present invention is intended and adapted to overcome the difficulties and disadvantages inherent in prior devices of the type described, it being among the objects of the invention to provide a cleaner which will be highly effective in the cleaning of surfaces.

In practicing the present invention, there is provided a passageway made of a suitable framework of metal or wood and having a protective covering on the top and sides thereof. The ends of the passageway so formed are open and a pair of tracks is provided at the bottom thereof so that a vehicle may run on said tracks into the passageway through the entrance opening thereof and out through the opposite or exit end thereof.

The present invention comprises a set of cleaners, usually three in number, one being adapted to contact the roof of the vehicle and the others, the two sides thereof. Each of these cleaners consists of two sheets of flexible material, such as soft vulcanized rubber mounted on opposite sides of a rotatable shaft. Each of the sheets has a series of notches at the outer sides thereof and the notches of one sheet are opposite the tongues on the complementary sheet of the unit.

There is also provided a pair of cleaners of different construction for the wheels of the vehicle. These cleaners consist of disks on horizontal axes and having sheets radially arranged on said disks and extending inwardly to contact the wheels. All of the cleaners are connected to a source of power and are rotated during the cleaning operation. Sprays for detergent solutions and for rinsing water are provided. A set of said cleaners is mounted at the exit end of said passageway and serve as means for drying the vehicle, and in some cases the drying action is assisted by a current of warm or cold air at said exit end.

In the accompanying drawings constituting a part hereof, and in which like reference characters indicate like parts, Fig. 1 is a side elevational view of a mechanism for washing vehicles made in accordance with the present invention, the covering of the passageway being omitted;

Fig. 2 is a top plan view of the mechanism shown in Fig. 1, some parts being broken away for clearness;

Fig. 3 is a vertical cross-sectional view of the mechanism taken along the line 3—3 of Fig. 1;

Fig. 4 is a vertical cross-sectional view thereof taken along the line 4—4 of Fig. 1;

Fig. 5 is a vertical cross-sectional view thereof taken along the line 5—5 of Fig. 1;

Fig. 6 is a vertical cross-sectional view of a part of the mechanism taken along the line 6—6 of Fig. 2, and Fig. 7 is an enlarged fragmentary cross-sectional view of one of the cleaners taken along line 7—7 of Fig. 3.

There is provided a framework consisting of vertical end members 1 and 2, with roof beams 3 and floor beams 4, with suitable side members 5 and 6, all joined together to form a rigid framework. The top and longitudinal sides thereof are covered with sheeting of metal or other materials in order to form an enclosure and provide a passageway for vehicles to enter into the entrance end thereof at 1 and to leave at 2. For clearness, the covering has been omitted from the drawings.

Just inside the entrance to the passageway is a set of cleaners designated generally by numeral 7 where the washing and cleaning of the vehicle takes place. At the central portion of the passageway is a mechanism generally designated as 8, whereby rinsing and removal of residual dirt is accomplished. Near the exit end of the passageway is a drying mechanism generally designated as 9, whereby the vehicle is substantially dried. A pair of tracks 10 pass through the passageway and the vehicle rolls along said tracks through the several stations 7, 8 and 9.

Referring particularly to Fig. 2, station 7 has a shaft 11 mounted horizontally on the top thereof and carrying a cleaner 12, the shaft being journalled in bearings 13 with bevelled gears 14 connecting with longitudinal shaft 15. At one side of station 7 is a similar cleaner 16 mounted on a vertical shaft 17 held in bearings 18 and connected to shaft 11 by bevelled gears 19. At the side opposite cleaner 16 is a similar cleaner 20 mounted on vertical shaft 21 held in bearings 22 and being connected by bevelled gears 23 to shaft 11.

An additional set of cleaners along the sides of station 7 and adapted to clean the wheels of the vehicle consist of a vertical disk 23' having radial strips 24 on the inner face thereof, said strips being soft and flexible and usually made of soft vulcanized rubber. Bevelled gears 25 are connected to horizontal stub shaft 26 connecting to the rear face of disk 23. Gearing 25 is mounted on shafts 17 and 21, respectively, and shafts 26 mounted in bearings 18 and 22, respectively.

Water enters the mechanism through pipe 27 and is distributed at station 7 by a series of vertical pipes 28 and horizontal pipes 29. Each of said pipes is perforated so that sprays of liquid at relatively high pressure may impinge upon the vehicle to loosen the dirt thereon. Suitable valves (not shown) may be provided to control the flow of liquid in said pipes. A container 30 for soap solution or other detergent is mounted on the top of the framework and a horizontal pipe 31 extends transversely thereof above cleaners 12, 16 and 20. The lower edge of pipe 31 is perforated so as to uniformly distribute detergent solution onto the cleaners. The ends of pipe 31 are held in supports 32 mounted on the framework.

Each of the cleaners, such as 12, consists of two sheets of semi-stiff but flexible material such as soft vulcanized rubber, as more particularly shown in Figs. 6 and 7, constituting a set of cleaners. The central portions 33 and 34 of each of the sheets is secured to the respective shaft, such as 11, by rivets 35 passing transversely through said sheets and shaft. The outer edges 36 and 37 of sheets 33 and 34 are usually thinner than the central portions so that they are more flexible. Said central portions are intended to be stiffer and to support the outer portions while allowing the same to flex. Sheet 33 has alternately tongues 38 and notches 39 usually approximately equal in width. Sheet 34 has corresponding tongues 38' and notches 39' and as sheets 33 and 34 are assembled on the shaft, a notch 39 is opposite a tongue 38' and a tongue 38 is opposite a notch 39'.

The functions of these cleaners are of considerable importance. Because of the staggered relation of the tongues and notches in the pairs of sheets, said elements will contact the entire surface of the vehicle covered by the cleaner unit. Because of the flexibility of the tongues and the length thereof, they will contact the body of the vehicle over a relatively large surface area and will wipe along said area so that not only is dirt loosened thereby but is moved out of position and subjected to the flushing away thereof by the liquid used in the operation. Also the contact of said tongues with the vehicle body is intermittent, thus allowing an intermediate wetting by the liquid used so that upon the next contact the tongues operate on wet surfaces and are extremely effective because of this. The meeting edges of the tongues and central portions are usually along a diagonal line 40 as shown in Fig. 3, to give varied amounts of pressure and contact of the tongues during the operation.

Referring to Fig. 4, there is shown a similar arrangement at station 8 where rinsing takes place. Cleaner 41, similar to 12, 16 and 20, is mounted on horizontal shaft 42. Side cleaner 43 is mounted on vertical shaft 44 and opposite side cleaner 45 is mounted on vertical shaft 46. Wheel cleaners 47 are provided similar to cleaners 24. All said cleaners are connected by bevelled gearing similar to that of Fig. 3 and bevelled gearing 48 is provided to connect the same to shafts 15 and 15'. An extension 49 of pipe 27 has vertical branches 50 and horizontal branches 51, all such branch pipes being perforated so as to spray liquid inwardly and downwardly on to the cleaners similar to the construction at station 7. Valves (not shown) may be provided for the control of the flow of liquid in pipes 50 and 51.

With particular reference to Fig. 5, there is provided at station 9 top cleaner 52 mounted on horizontal shaft 53, side cleaner 54 mounted on vertical shaft 55 and opposite side cleaner 56 mounted on vertical shaft 57. Shaft 53 is connected by bevelled gearing 58 to shaft 15'. Shaft 59, shown in Fig. 2, connected to shaft 11 is rotated by a motor or other propelling device (not shown). Wheel cleaners 60 similar to cleaners 24 are provided and all of the cleaners 52, 54, 56 and 60 are connected by bevelled gearing into the system similar to that described in connection with Figure 3.

In the operation of the device, a vehicle such as a passenger car is moved on the tracks 10 into opening or passageway 61, as shown in Fig. 3. The length of the tongues of cleaners 12, 16 and 20 is such that they extend into the space to be occupied by the vehicle and therefore are flexed by the movement of the vehicle into the passageway. The motor is started, causing revolution of the several cleaners and water is caused to flow in pipe 27 and soap solution in pipe 31. This wets the several cleaners both by direct application of sprays and by the action of gravity so that the cleaners are thoroughly wetted with the cleaning solution. During their rotation, they repeatedly and completely loosen and remove the dirt from the bottom and wheels of the vehicle. As the latter passes to station 8, rinsing water sprayed from pipes 50 and 51 contacts the body of the vehicle and cleaners 41, 43, 45 and 47 assist the rinsing action by removing dirty water as it is sprayed onto the vehicle body. The vehicle as it passes to station 9 is now subjected to the action of cleaners 52, 54, 56 and 60 without the application of water and the wiping or squeegee action of the flexible tongues substantially completely dries the body. Also the friction of such tongues on the body causes the generation of heat, assisting the drying operation. In some cases, it is advisable to cause a gentle flow of a current of air at station 9 and this may be provided by fans or the like suitably placed. If desired, such air may be previously warmed to facilitate drying.

Although the invention has been described setting forth a single specific embodiment thereof, the invention is not to be limited to the specific details of construction as numerous variations in such details may be made within the principles herein set forth. For instance, at station 8, one or more of the cleaners may be omitted and in some cases, the rinsing operation may be in the absence of any cleaning or rubbing action. The detergent solution may be introduced directly into the flow of water to pipes 28 and 29 and other detergents may be substituted for the soap. The exact mounting and connections of the rotating elements may be changed in accordance with mechanical details which are well-known.

These and other changes in the details of construction may be made within the spirit of the invention, which is to be broadly construed and not to be limited except by the character of the claims appended hereto.

I claim:

1. A cleaner comprising a shaft, a flexible flat sheet fixed on said shaft along a longitudinal line, an edge of said sheet being substantially parallel to the axis of said shaft, said sheet having a series of substantially transverse slits in said edge, successive slits being of increased depth, whereby a series of tongues of increasing length are provided, said sheet extending similarly from the opposite side of said shaft and having therein a similar series of substantially transverse slits, the latter being of decreasing depth so that the shorter of the tongues so formed are opposite the longer tongues of the first mentioned edge.

2. A cleaner comprising a shaft, a flexible flat sheet fixed on said shaft along a longitudinal line, an edge of said sheet being substantially parallel to the axis of said shaft, said sheet having a series of substantially transverse slits in said edge, successive slits being of increased depth, whereby a series of tongues of increasing length are provided, a second flexible flat sheet on said shaft substantially parallel with said first sheet and having a series of substantially transverse slits of increasing depth.

3. A mechanism for washing comprising at least one set of cleaners, a shaft on which said set is mounted, two substantially parallel flexible flat sheets constituting said set of cleaners fixed on opposite sides of said shaft along the central portions of said sheets, and relatively deep notches along the edges of said sheets, said notches being in the free edges of said sheets and being substantially perpendicular to said shaft, said notches being parallel to each other and forming parallel tongues in said sheets.

4. A mechanism for washing comprising at least one set of cleaners, a shaft on which said set is mounted, two substantially parallel flexible flat sheets constituting said set of cleaners fixed on opposite sides of said shaft along the central portions of said sheets, and relatively deep notches along the edges of said sheets, said notches being in the free edges of said sheets and being substantially perpendicular to said shaft, said notches being parallel to each other and forming parallel tongues in said sheets, the notches of one sheet being opposite the tongues of the other sheet.

5. A mechanism for washing comprising at least one set of cleaners, a shaft on which said set is mounted, two substantially parallel flexible flat sheets constituting said set of cleaners fixed on opposite sides of said shaft along the central portions of said sheets, and relatively deep notches along the edges of said sheets, said notches being in the free edges of said sheets and being substantially perpendicular to said shaft, said notches being parallel to each other and forming parallel tongues in said sheets, the notched portions being of lesser thickness than the center portions, the latter being sufficiently stiff to support said notched portions.

6. A mechanism for washing comprising at least one set of cleaners, a shaft on which said set is mounted, two substantially parallel flexible flat sheets constituting said set of cleaners fixed on opposite sides of said shaft along the central portions of said sheets, and relatively deep notches along the edges of said sheets, said notches being in the free edges of said sheets and being substantially perpendicular to said shaft, said notches being parallel to each other and forming parallel tongues in said sheets, the notched portions being of gradually decreasing depth from end to end of said sheets.

7. A mechanism for washing comprising at least one set of cleaners, a shaft on which said set is mounted, two substantially parallel flexible flat sheets constituting said set of cleaners fixed on opposite sides of said shaft along the central portions of said sheets, and relatively deep notches along the edges of said sheets, said notches being in the free edges of said sheets and being substantially perpendicular to said shaft, said notches being parallel to each other and forming parallel tongues in said sheets, the tongues being of gradually decreasing depth from end to end of both said sheets along one edge and of gradually increasing depth along the opposite edge.

JIUSTINO RENDE.

References Cited in the file of this patent

UNITED STATES PATENTS

| Number | Name | Date |
| --- | --- | --- |
| 461,223 | Snow | Oct. 13, 1891 |
| 602,266 | Peck | Apr. 12, 1898 |
| 655,568 | Muller | Aug. 7, 1900 |
| 848,974 | Crossman | Apr. 2, 1907 |
| 1,232,815 | Lapedes | July 10, 1917 |
| 1,297,694 | Kindling | Mar. 18, 1919 |
| 1,298,096 | Roberts | Mar. 25, 1919 |
| 1,320,513 | Volckening | Nov. 4, 1919 |
| 1,411,321 | Wright | Apr. 4, 1922 |
| 1,458,179 | Hamer | June 12, 1923 |
| 1,740,525 | Tyson | Dec. 24, 1929 |
| 1,934,494 | Gillespie | Nov. 7, 1933 |
| 2,025,780 | Rosenbrook | Dec. 31, 1935 |
| 2,257,255 | Yingling | Sept. 30, 1941 |
| 2,259,144 | Volckening | Oct. 14, 1941 |
| 2,334,690 | Yden | Nov. 23, 1943 |

FOREIGN PATENTS

| Number | Country | Date |
| --- | --- | --- |
| 48 | Great Britain | of 1872 |
| 290,515 | Great Britain | May 17, 1928 |
| 291,620 | Great Britain | June 7, 1928 |
| 275,658 | Germany | June 26, 1914 |